United States Patent [19]

Fisher

[11] Patent Number: 4,534,445

[45] Date of Patent: Aug. 13, 1985

[54] AIRCRAFT SLIDE PACKING FIXTURE

[75] Inventor: John M. Fisher, Cuyahoga Falls, Ohio

[73] Assignee: The B. F. Goodrich Company, Akron, Ohio

[21] Appl. No.: 609,617

[22] Filed: May 14, 1984

[51] Int. Cl.³ .............................................. B64D 25/14
[52] U.S. Cl. .................................. 182/48; 193/25 B; 244/137 P
[58] Field of Search ................. 182/48, 49; 193/25 B, 193/25 R; 244/137 P

[56] References Cited

U.S. PATENT DOCUMENTS

| | | | |
|---|---|---|---|
| 3,771,749 | 11/1973 | Smialowicz | 182/48 |
| 3,910,532 | 10/1975 | Fischer | 182/48 |
| 4,013,247 | 3/1977 | Giffin | 182/48 |
| 4,375,877 | 3/1983 | Shorey | 193/25 B |
| 4,441,582 | 4/1984 | Ward | 244/137 P |

Primary Examiner—Reinaldo P. Machado
Attorney, Agent, or Firm—Joseph Januszkiewicz

[57] ABSTRACT

A packboard fixture device consisting of a support cradle, aluminum vacuum caps, pressure block and cargo strap assembly. The support cradle is an aluminum structure with a base, side supports, and two vertical end walls, the shorter of which is hinged to allow installation and removal of the packboard with collapsed slide. The vacuum caps are preferably aluminum with rubber sealing lips which are pushed onto the pump heads mounted in the packboard. These seal off the pumps and allow a vacuum to be established within the fabric slide to evacuate all air within the slide to be folded. A thick wooden member functions to uniformly compress the deflated slide into the packboard. It acts as a pressure block to distribute the compressive forces uniformly over the hinged mechanism as it is drawn down by straps using a rachet type device for drawing the straps in tension.

5 Claims, 6 Drawing Figures

AIRCRAFT SLIDE PACKING FIXTURE

BACKGROUND OF THE INVENTION

Modern aircraft, particularly those for larger numbers of commercial passengers, are normally equipped with inflatable slides for deployment in emergency situations. When deployed through inflation they provide a slide type ramp for use by passengers evacuating the aircraft. Such slides are normally maintained in the aircraft in an uninflated condition adjacent the aircraft door stored within a packboard which is rigid except for its top surface through which the slide is packed into the packboard.

This invention relates to a device which provides a mechanical assist in forming the collapsed escape slide for an aircraft, such as the 747-300 Upper Deck, into a proper shape and density to fit within a specific packboard container.

This particular escape slide presents a unique problem in that it is contained within rigid wall members of the packboard and does not utilize a flexible lace down cover. The normal lace down cover allows the fabric to be kneaded and gradually pulled into contour of the supporting container by a lacing action similar to a shoe lace lacing arrangement. However, with the present upper deck evacuation system, the slide must be forced into position within the rigid walls of the packboard using high compression forces that can only be attained mechanically. These forces must be carefully distributed against the rigid wall members to preclude cracking of the packboard or bending of the hinge members of the deployment device.

SUMMARY OF THE INVENTION

The above noted problems are solved by the special inventive packing fixture constructed in accordance with the present invention.

The packboard fixture device consists of a support cradle, aluminum vacuum caps, pressure block and cargo strap assembly. The support cradle is an aluminum structure with a base, side supports, and two vertical end walls, the shorter of which is hinged to allow installation and removal of the packboard with collapsed slide. The larger vertical wall is secured internally with the base by diagonal braces which act as the side supports for the packboard. The cradle is precisely contoured to receive the slide packboard and includes cavities and openings to allow items of the packboard to protrude through the cradle, such items include sponge pads, support feet, vacuum fittings and the like. Once the packboard is inserted and the hinged end wall secured, the deflated fabric slide is folded within the cavity of the packboard and protrudes thereabove due to its bulk. The deployment hinge mechanism is rotated over the folded slide and the pressure block laid over the hinge mechanism.

The vacuum caps are preferably aluminum with rubber sealing lips which are pushed onto the pump heads mounted in the packboard. These seal off the pumps and allow a vacuum to be established within the fabric slide to evacuate all air within the slide to be folded. The caps have a special fitting that allows a vacuum line to be attached on the exterior side while the opposite side provides a probe which holds hinged flapper valves of the valves in an open position to allow air passage outwardly.

A thick wooden member functions to uniformly compress the deflated slide into the packboard. It acts as a pressure block to distribute the compressive forces uniformly over the hinged mechanism as it is drawn down by straps using a rachet type device for drawing the straps in tension.

Lastly, the straps utilized are common type strap assemblies used for securing cargo pallet loads. A handle rotates a racheted roller that tensions and holds the strap. By use of the strap arrangement, the walls of the package are forced into position in a controlled and accurate manner. By rotational use of the straps, the walls of the packboard are properly aligned within the fixture with the ratching member so that the latch pins may be properly installed.

Further objects and advantages will become apparent upon a reading of the following detailed description of the invention when read in association with the accompanying drawings.

BRIEF DESCRIPTION OF THE DRAWINGS

FIG. 2 is an enlarged perspective view of the cradle of the packboard fixture device shown in FIG. 1 but from the opposite side to show the larger, fixed end plate head on.

DESCRIPTION OF THE PREFERRED EMBODIMENT

Figure 1:
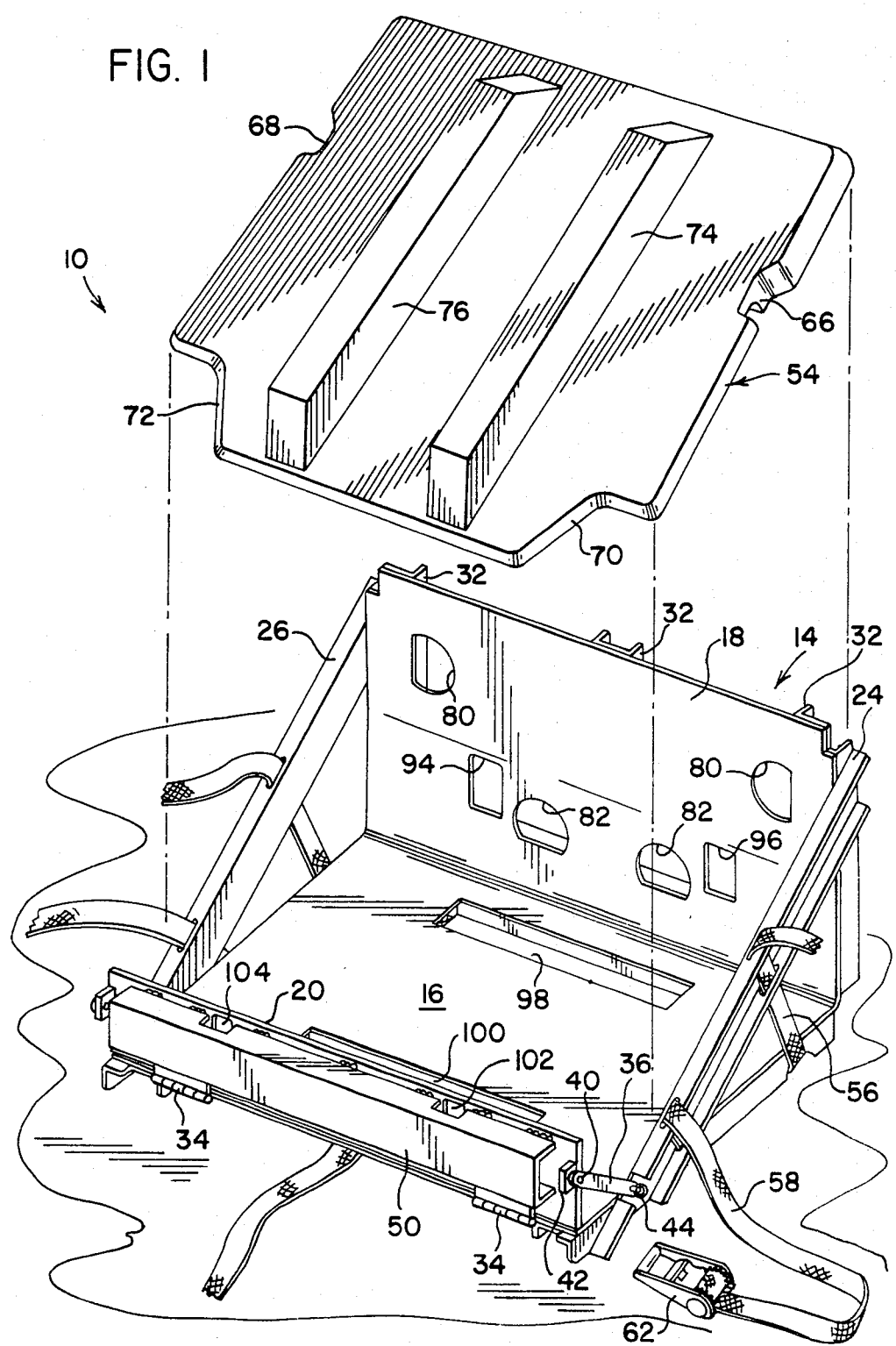
FIG. 1 is an enlarged perspective view of the packboard fixture device constructed in accordance with the present invention showing the cradle, side straps and support braces and also showing the pressure block thereabove but with the packboard and slide removed.
Figure 2:
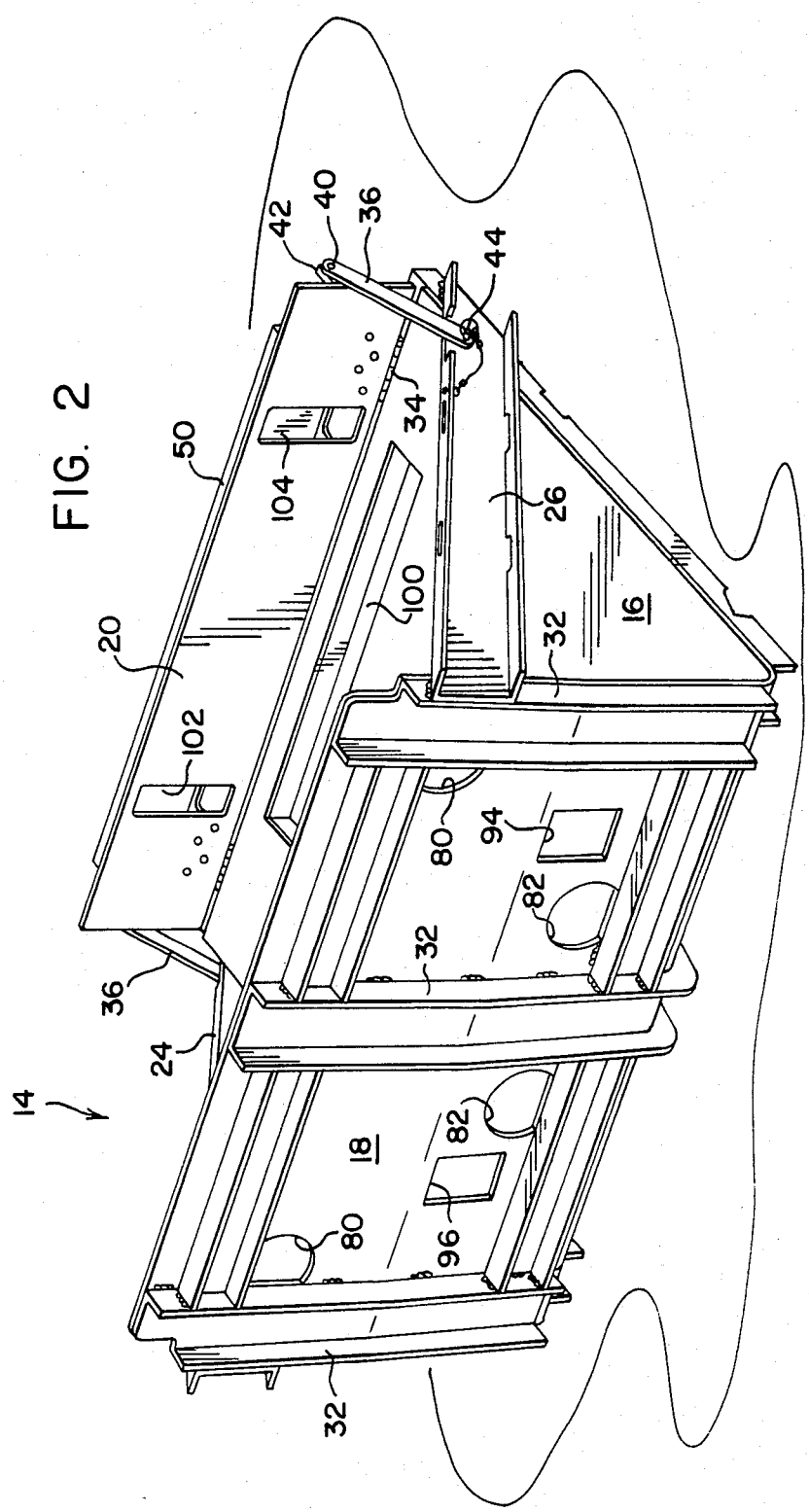

Referring now to the Figures, the packboard fixture device of the present invention is shown in the enlarged perspective view of FIG. 1. The packboard fixture device 10 includes a cradle 14 having a base plate 16 and, integral therewith, two vertical end walls. One end wall 18, the larger, is integral with the base plate. The other end wall, 20, the shorter, is rotatably secured with hinges to the base plate. Channel iron 24 and 26 is formed to constitute braces or edge supports for coupling the base plate and the head plate on opposite sides of the fixture. The edge supports, like the end walls, also constitute guides for the proper reception and alignment of a packboard 30 within the packing fixture device during operation. Supplemental pieces 32 of rigid channel iron also provides support and rigidity to the cradle.

Figure 3:
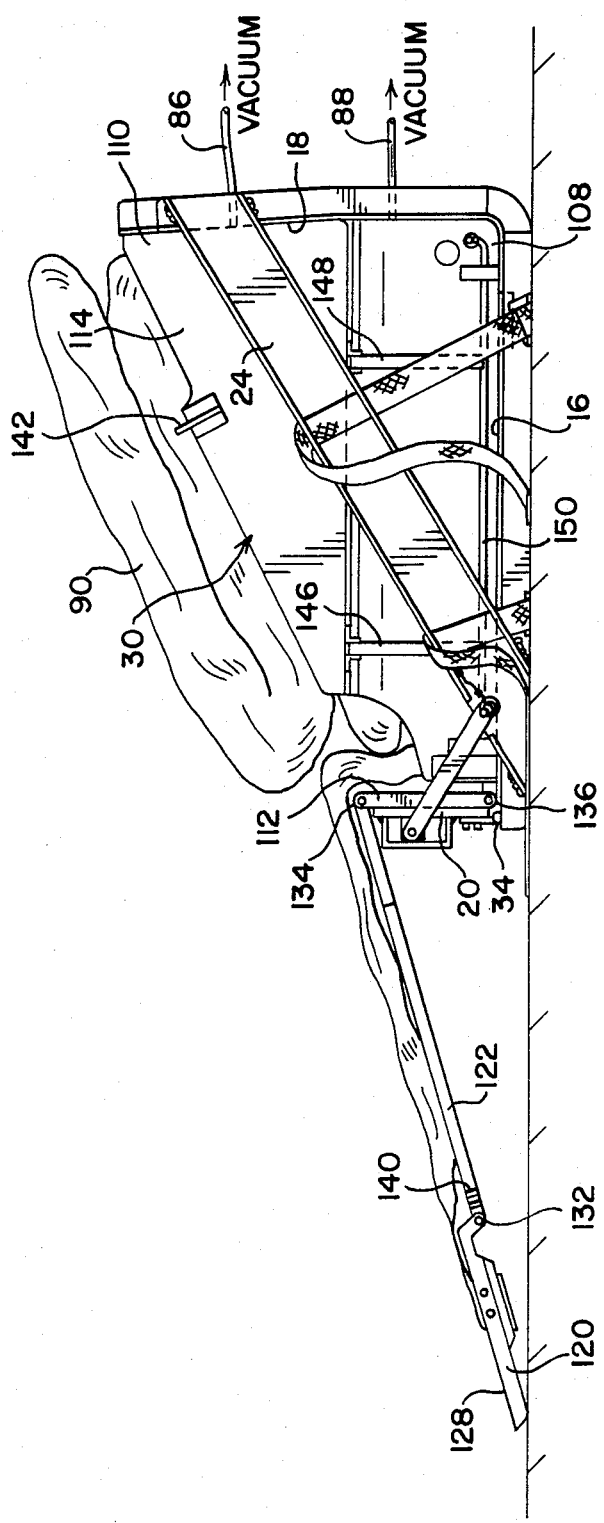
FIG. 3 is a side elevational view of the packboard fixture device of FIGS. 1 and 2 but with the packboard operatively positioned for receiving the collapsed, inflatable slide and also showing the slide being packed into the packboard.
Figure 4:
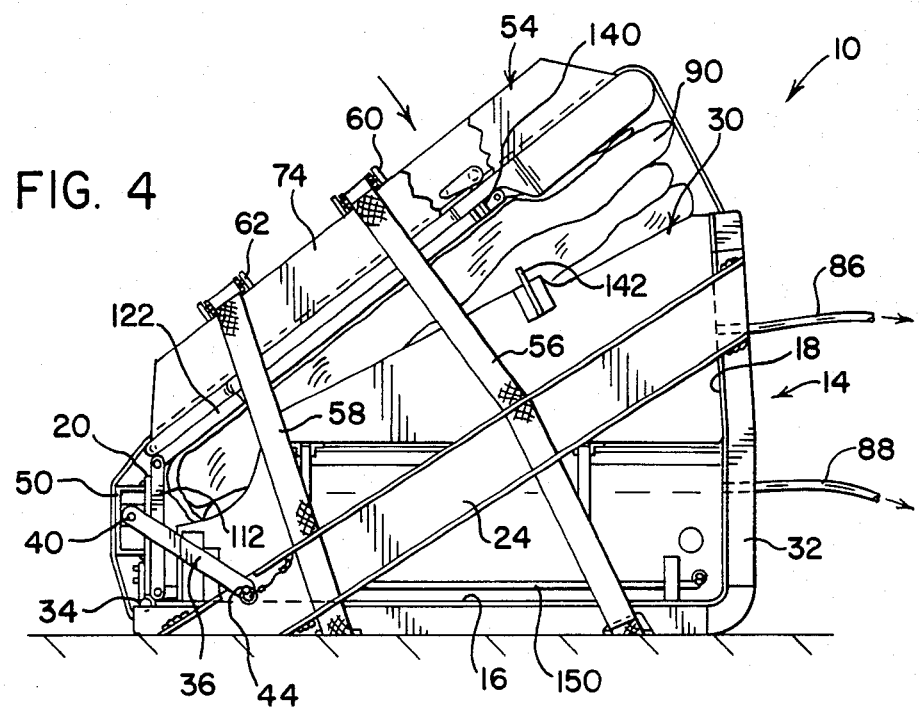
FIG. 4 is a side elevational view of the same packboard fixture device, packboard and slide as shown in FIG. 3 but with the inflatable folded and with the pressure device mounted thereover for applying pressure to the slide.
Figure 5:
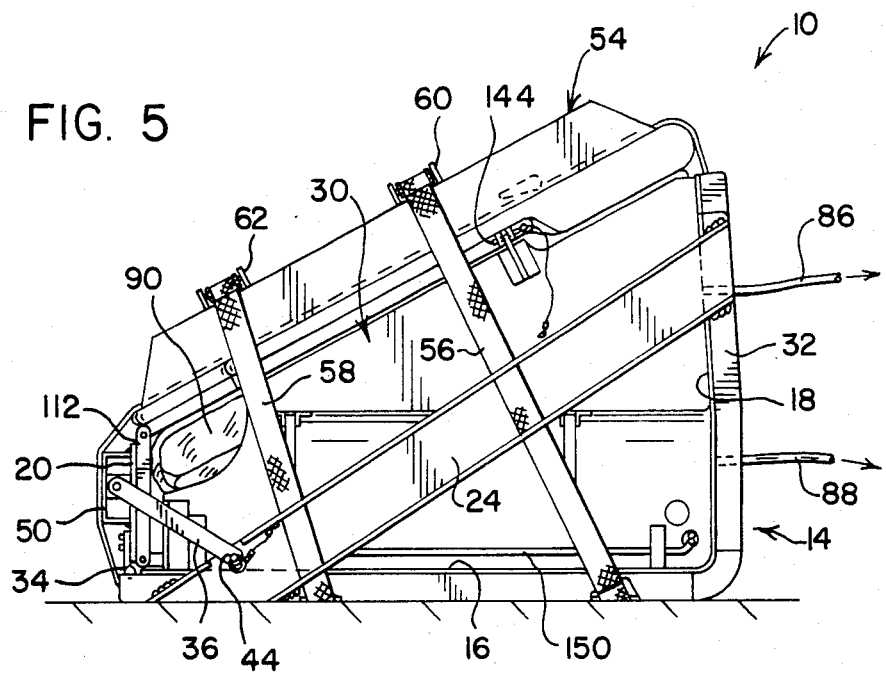
FIG. 5 is a side elevational view of the same packboard fixture device as shown in FIG. 4 but subsequent to the pressure being applied to the slide and with the packboard and inflatable ready for separation and mounting in an aircraft for use.

Also secured to the cradle is a short end wall pivotally mounted to the base plate of the cradle through hinges along their common length. The short end wall is adapted to be pivoted around its hinges 34 to an open position generally parallel with the base plate as shown in FIG. 3 to a position perpendicular to the base plate and then parallel with and above the head plate as shown in FIGS. 4 and 5 during the packing operation. Linkage members 36 on opposite sides of the cradle are pivotally mounted by pins 40 mounted on support blocks 42, of the pivotal end wall. The opposite or releasable ends of the linkage members can be secured by latch pins 44 to the side braces of the packing structure.

Apertures are provided in the linkage members and side braces for the reception of the pins. The latching pins 44 are shown secured in FIGS. 1 through 5 for maintaining the cradle in a condition for receiving the packboard for loading of the slide. With the latch pin removed, the pivotal end wall can be pivoted to parallelism with the base plate as shown in FIG. 1 for loading the packboard into position for receiving the slide and for removing the loaded packboard from the fixture.

Also located on the pivotal end wall is a supplemental piece of channel iron 50 for adding rigidity to that portion of the cradle to which the channel iron or brace is attached.

Figure 6:
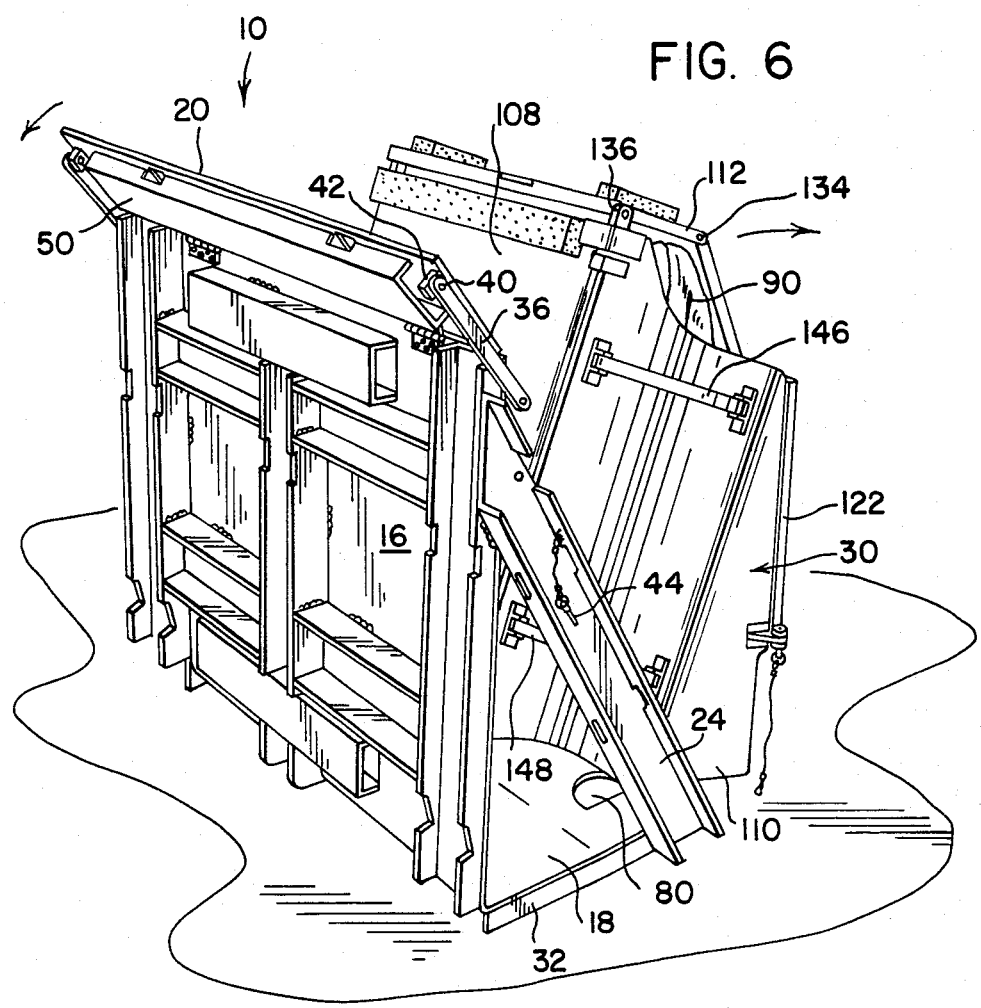
FIG. 6 is a enlarged perspective view of the packboard fixture device, packboard and slide therein but with the packboard fixture device tipped upwardly and partially open for the removal of the packboard and slide from the fixture.

For use in operative association and forming part of the packboard fixture device is the pressure block 54. The pressure block is preferably formed of a thick piece of wooden material. Its function is to distribute compressive forces uniformly over the inflatable being packed. It is initially placed over the packboard and fixture in contact with the slide when the slide is still uncompressed into the packboard. Note FIG. 4. Through the proper application of forces it will accurately allow the application of compressive forces to force the slide into the packboard for deployment of the slide as shown in FIGS. 5 and 6.

In order to apply such forces uniformly, a plurality of straps 56 and 58 are located circumferentially around the packboard fixture device. The straps extend circumferentially as well as longitudinally by virtue of their width. They are each provided with racheting buckles 60 and 62 for the smooth application of forces. The straps are adapted to extend around the packboard fixture device, the packboard inflatable as well as the pressure block during the packing operation. Suitable edge notches 66 and 68 are provided in the pressure block, aligned with slots in the channel iron for the alignment of the straps. Supplemental corner cut-outs 70 and 72 in the pressure block are also provided for mating engagement of the block with the linkages of the fixture. Upstanding braces 74 and 76 on the side of the pressure block remote from the inflatable are adapted to contact and support the straps with the ratchets thereon for the smooth distribution application of pressure.

As can be seen in the drawings, cut-outs 80 and 82 are provided in the larger end plate of the cradle for the passage of a vacuum lines 86 and 88 from the inflatable slide 90 to sources of pressure, positive or negative. Rectangular cut-outs 94 through 104 are provided on all the surfaces of the cradle including the base plate and end walls, large and small, for the reception of foam rubber segments, part of the packboard, for proper alignment of the packboard within the cradle. When the packboard is positioned in the aircraft for use, these foam rubber elements provide a cushioning force to the packboard with its slide.

FIGS. 3, 4 and 5 show the packboard fixture device with the packboard in operative position thereon. The packboard has a rigid base plate 108 supported on the base plate 16 of the packing fixture, a long end wall 110 supported by the long end wall 18 of the packing fixture, a short end wall 112 supported by the pivotal short end wall 20 of the packing fixture and side walls 114 and 116 supported by the edge supports 24 and 26 of the packing fixture. The shape of the packboard is such to include a horizontal lower base plate, a vertical shorter face and an essentially vertical longer face and side walls therebetween. The open face is sloped for being received in mating engagement in the aircraft in which it is to be employed.

As shown in FIG. 3, the short end wall of the packboard, that portion of the packboard which, during loading of the slide, mates with the pivotal end wall of the fixture device is formed of three hinged sections, 120, 122 and 112. The hinged sections include an outboard section 120, the upper portion 128 of which as shown in FIG. 3 constitutes a sill hinge and part of the floor of the aircraft. The intermediate section 122 is provided at opposite ends with hinges 132 and 134 and is adapted to be located over the open end of the packboard in a sealing engagement therewith to assist in providing the compressive forces to the slide. A third hinge 136 is provided on the base plate of the packboard. A clevis 140 is milled into the edge of the intermediate section to straddle latch 142 on the packboard, one being provided on each side.

Also shown in FIG. 5 is a lanyard 144 for holding in hinged sections 120, 122, and 112, of the packboard in position when in the aircraft. When the packboard is deployed laynard 144 is pulled to release these hinged sections to permit the inflating slide to be released from the packboard in which it is contained.

FIGS. 4 and 5 are similar to those of the prior figures but show the inflatable being pressure fit into the packboard. This is being done by the application of forces through the straps and rachet buckles as described above.

After the inflatable is properly positioned, all the rachet and straps are removed and the packboard is tipped upwardly with its larger end wall horizontal adjacent the ground and the base plate extending vertically. The pivotal end wall is then pivoted out of position so that the packboard and inflatable extend vertically upwardly and can be pivoted away from the base plate of the cradle as shown by the direction of the arrow in FIG. 6.

Also shown in FIG. 6 are side bottle restraining straps 146 and 148, two per side, for the holding of the bottle of aeroform fluid when the packboard is positioned on the aircraft. The firing pin is coupled with the bottle through a lanyard string in tube 150 having loops at opposite ends. One loop couples directly to the firing pin with the opposite end providing a loop coupling to the inflation bottle. The string is positioned so that upon deployment of the packboard by being pushed from the aircraft, the string will be elongated and pressure therefrom will fire the pin to inflate the inflatable.

The lanyard string in tube 150 is axially moveable therethrough. When the packboard is deployed, the free end of the string in the tube is moved to exert a pressure on its opposite end to activate the bottles containing the source of aeroform fluid. This in turn initiates the inflation of the inflatable slide being deployed.

While the present invention has been described as being carried out in a particular embodiment thereof, it is not intended to be so limited but it is intended to be covered broadly within the spirit and scope of the appended claims.

What is claimed is:

1. A packboard fixture device for assisting in the positioning of a deflated pneumatic slide into a rigid packboard locatable in the packboard fixture device, the device including a cradle having a base plate, a long upstanding end wall and a short upstanding end wall pivotal with respect to the base plate, a separate pressure block mountable over the device on the side opposite the base plate between the end walls and further including strap means for applying pressure to the pressure block for movement toward the base plate to uniformly compress a deflated pneumatic slide into the packboard.

2. The device as set forth in claim 1 and further including cut-outs in the long upstanding end wall for the reception of pneumatic lines for deflating a pneumatic slide therein.

3. The device as set forth in claim 2 and further including additional cut-outs in the base plate and walls for receiving positioning elements of the packboard.

4. The device as set forth in claim 1 and further including pin means to secure the short upstanding end wall in position essentially parallel with the long upstanding end wall while the packboard is being packed with a deflated pneumatic slide, said pin means being removable to permit the loading and unloading of the packboard into the device.

5. A packboard fixture device for assisting in the positioning of a deflated pneumatic slide into a rigid packboard locatable in the packboard fixture device, the device including a cradle having a base plate, a long upstanding end wall, including cut-outs in the long upstanding end wall for the reception of pneumatic lines for deflating a pneumatic slide therein, and a short upstanding end wall pivotal with respect to the base plate, and including additional cut-outs in the base plate and walls for receiving positioning elements of the packboard, a separate pressure block mountable over the device on the side opposite the base plate between the end walls and further including strap means for applying pressure to the pressure block for movement toward the base plate to uniformly compress a deflated pneumatic slide into the packboard and further including pin means to secure the short upstanding end wall in position essentially parallel with the long upstanding end wall while the packboard is being packed with a deflated pneumatic slide, said pin means being removable to permit the loading and unloading of the packboard into the device.

* * * * *